United States Patent [19]

Keon

[11] Patent Number: 4,981,389
[45] Date of Patent: Jan. 1, 1991

[54] FLEXIBLE HUB ASSEMBLY HAVING A HUB FOR CLAMPING A SHAFT

[76] Inventor: Richard F. Keon, P.O. Box 240062, Charlotte, N.C. 28224

[21] Appl. No.: 318,235

[22] Filed: Mar. 3, 1989

[51] Int. Cl.⁵ .............................................. F16B 7/04
[52] U.S. Cl. .................................. 403/290; 403/344; 403/370
[58] Field of Search ............... 403/370, 371, 344, 367, 403/368, 373, 374, 273, 290, 16

[56] References Cited

U.S. PATENT DOCUMENTS

| | | |
|---|---|---|
| 669,927 | 3/1901 | Hoffmann . |
| 2,205,474 | 6/1940 | Goeller ............................ 403/373 |
| 2,395,169 | 2/1946 | Crane et al. . |
| 2,467,819 | 4/1949 | Firth . |
| 2,804,322 | 8/1957 | Herzog . |
| 3,023,034 | 2/1962 | Chung ............................ 403/344 X |
| 3,042,433 | 7/1962 | Koen . |
| 3,081,099 | 3/1963 | Walker et al. . |
| 3,109,663 | 11/1963 | Phillips . |
| 3,127,202 | 3/1964 | Koen . |
| 3,139,296 | 6/1964 | Greene . |
| 3,160,429 | 12/1964 | Martins ............................ 403/370 |
| 3,190,215 | 6/1965 | Howard et al. . |
| 3,473,202 | 10/1969 | Howard ............................ 403/290 X |
| 3,626,721 | 12/1971 | Koen . |
| 3,876,318 | 4/1975 | Crispell ............................ 403/344 X |
| 4,781,486 | 11/1988 | Mochizuki ............................ 403/371 X |

FOREIGN PATENT DOCUMENTS 2808696 9/1979 Fed. Rep. of Germany ...... 403/374

*Primary Examiner*—Peter M. Cuomo
*Attorney, Agent, or Firm*—Shefte, Pinckney & Sawyer

[57] ABSTRACT

A flexible hub apparatus for securing a power takeoff element to a shaft includes a hub formed of resilient material and having a first end and a second end and a hub spacing unit for selectively moving the hub between a shaft removal position and a shaft clamping position. The hub defines an inner circumference for receiving the shaft therein for clamping engagement by the hub. The first and second hub ends are movable relative to one another between the shaft clamping position in which the effective inner circumferential extent of the hub is such that the hub clamps the shaft and the shaft removal position in which the effective inner circumferential extent of the hub is such that the shaft is freely removable from the hub. The hub spacing unit includes a movable member disposed between the first and second hub ends for selective surface-to-surface engagement therewith and at least one of the engagement surfaces is tapered.

11 Claims, 3 Drawing Sheets

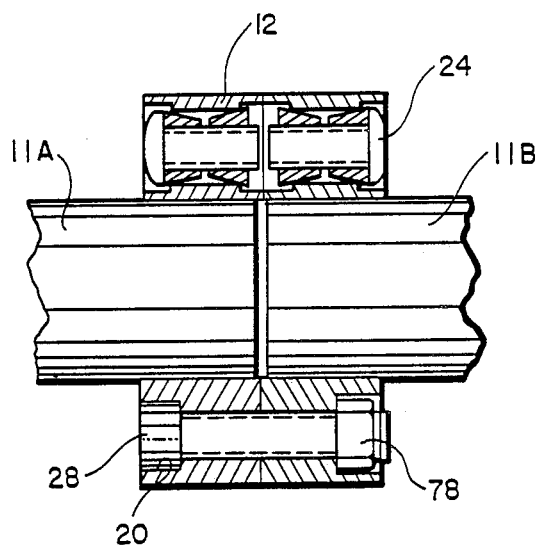
FIG. 7
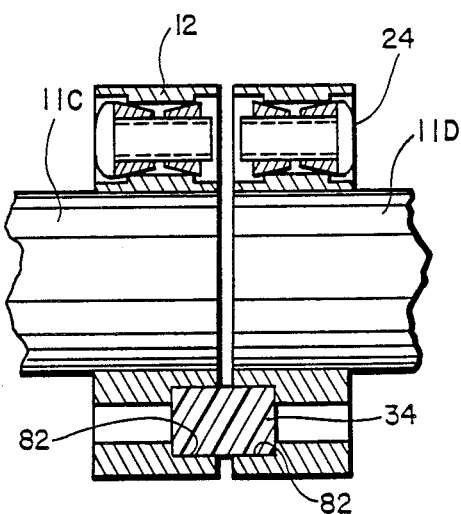
FIG. 8
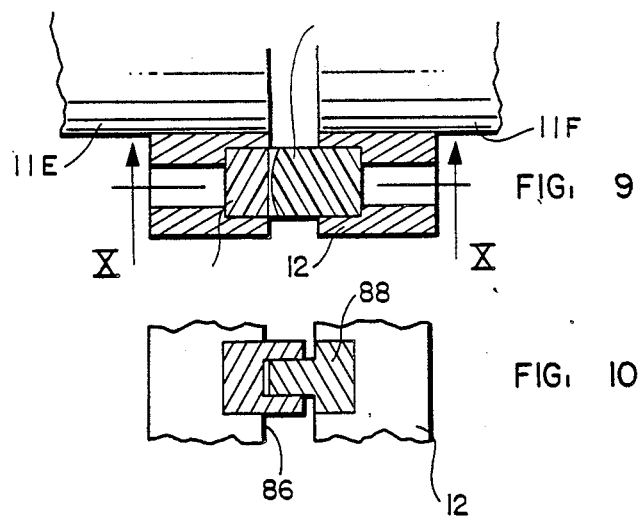
FIG. 9
FIG. 10
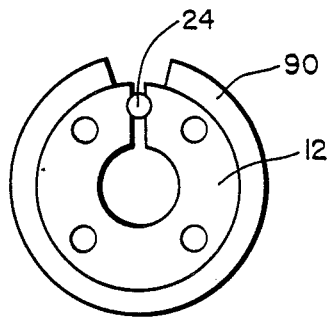
FIG. 11

FLEXIBLE HUB ASSEMBLY HAVING A HUB FOR CLAMPING A SHAFT

BACKGROUND OF THE INVENTION

The present invention relates to an assembly including a flexible hub for clamping the flexible hub to a shaft or the like and, more particularly, relates to a flexible hub assembly including a flexible hub and a tapered engagement surface for selective clamping and unclamping of the flexible hub to a shaft or the like.

One approach for transferring the rotation of a shaft or the like to a power takeoff element (e.g. a pulley, gear or sprocket) to thereby drive the element includes securing the power takeoff element to the shaft with sufficient clamping force such that torque, thrusts or combinations of these loads are reliably transmitted from the shaft to the power takeoff element and, ultimately, to the driven element associated with the power takeoff element. Accordingly, hubs have been developed for interconnecting power takeoff members such as bevel gears, pulleys and sprockets to rotating shafts and the like. To insure that the shaft loads are adequately transmitted to these rotation transferring elements and to prevent intolerable wear on the shaft, the hubs must clamp the shaft with sufficient purchase to insure that no slippage occurs therebetween. Representative structures of typical clamping hubs of this type are disclosed in U.S. Pat. Nos. 2,467,819, 3,127,202, 3,042,433 and 4,202,644.

However, these known locking hubs suffer from several recognized disadvantages. For example, in one known type of locking hub, a split ring member with a conical inner surface is superposed over another cylindrical hollow member having a conical outer surface. The conical surfaces of the two cylindrical hollow members slope in opposite directions. The shaft is disposed inside the inner cylindrical hollow member while the power takeoff element is disposed around the outer surface of the outer cylindrical hollow member. Adjustment or loading bolts are selectively rotated to cause axial forces to be directed against the two cylindrical hollow members to cause relative movement between the hollow members. As the cylindrical hollow members move relative to one another, the inner cylindrical hollow member progressively clamps the shaft while the outer cylindrical hollow member progressively expands against the power takeoff element. However, to achieve a non-slipping clamping action on the shaft and a non-slipping engagement with the power takeoff element, a relatively significant torque must be applied to the adjustment or loading bolts to continue to cause relative movement between the two cylindrical hollow members as the wedging action between the two members is increasingly resisted by the shaft on the inside diameter and the power takeoff element on the outside diameter. In fact, the torque required can typically be so great that the design of such locking hubs is limited by the yield strength of the torque applying tool, such as, for example, an Allen wrench. Due to this design constraint, the heat treatment, and thus the strength, of these steel hubs must be limited so that the yield strength of the adjustment tool is not exceeded. Accordingly, the strength of the steel, and its corresponding locking power, are limited. An additional disadvantage of these relatively moving wedge-shaped element type locking hubs is that the inner diameters of many conventional power takeoff elements such as sprockets, gears, pulleys and the like, is limited. Accordingly, if the locking hub is to be positioned between the shaft and the inside diameter of the power takeoff element—that is, flush mounted within the power takeoff element—the locking hub must necessarily have a limited radial extent and this tends to limit the locking power of the hub since the relatively small size of the hub limits the amount of strength material, such as metal, from which the hub can be formed. Yet another disadvantage of the known locking hubs is that effective operation of these hubs requires the user to accurately and reliably turn each adjustment bolt, in a predetermined sequence, to a predetermined torque value and this heavy reliance on the user's care and knowledgeability limits the dependability of these known hubs.

SUMMARY OF THE INVENTION

Accordingly, it is an object of the present invention to provide a locking hub assembly composed of steel, aluminum, or other suitable material which is heat-treatable to a greater degree than known prior art steel locking hubs.

It is yet another object of the present invention to provide a locking hub assembly which can be flush mounted inside a wide variety of power takeoff elements such as sprockets, gears, pulleys and the like.

It is yet a further object of the present invention to provide a locking hub assembly which provides a significant mechanical advantage when using an adjustment tool, such as an Allen wrench, in mounting the locking hub to a shaft or the like.

Briefly described, the present invention provides a hub for clamping attachment to a shaft or the like, the hub having a first end and a second end, and defining an inner circumference for receiving the shaft or the like therein for clamping engagement by the hub. The first and second hub ends are movable relative to one another between a shaft clamping position in which the effective inner circumferential extent of the hub is such that the hub clamps the shaft with sufficient purchase to secure the hub to the shaft, and a shaft removal position in which the effective inner circumferential extent of the hub is such that the shaft is relatively freely removable from the hub. Additionally, the hub has an inherent bias towards its shaft clamping position. The present invention further includes hub spacing means including at least one movable member disposed between the first and second hub ends for selective surface-to-surface engagement therewith, at least one of the engagement surfaces being tapered and being arranged to cause the relative movement of the first and second hub ends during predetermined movement of the movable member, whereby the movement of the movable member of the hub spacing means relative to the hub ends selectively permits the inherent bias of the hub to urge the hub toward the shaft clamping position and selectively moves the hub in opposition to its inherent bias toward the shaft removal position.

According to one aspect of the present invention, the hub spacing means further includes a second movable member and the first and second movable members each have a pair of tapered, opposed surfaces for selective surface-to-surface engagement with the first and second hub ends, with the angle of the taper being selected to cause self-releasing of movable members when they are moved to their shaft clamping position. Preferably, the first and second movable members each have a frusto-conical shape. Preferably, the first and second hub ends each have a partially cylindrical recess compatibly configured with the frusto-conically shaped first and second movable members.

According to one embodiment of the present invention, a ring-shaped hub is provided for interconnecting a power takeoff element to a shaft or the like for transmission of torque, thrust and other loads from the shaft or the like to the power takeoff element, the ring-shaped hub being adapted to clamp the shaft or the like with sufficient purchase to secure the hub to the shaft or the like. The ring-shaped hub has an axis, a generally annular outer surface, and an inner surface defining a circle generally concentric with the outer surface. The hub defines a slot extending between the inner and outer surfaces, the slot being formed by a pair of generally opposed faces, each face extending between the inner and outer surfaces and having an arcuate recess formed therein at approximately mid-length between the inner and outer surfaces. The ring-shaped hub is resiliently biased toward a bias position at which the hub is clamped to the shaft with sufficient purchase to secure the hub to the shaft, and the arcuate recesses are disposed relative to one another at a predetermined angular spacing with respect to the axis of the hub in the bias position of the hub. The embodiment further includes a first frusto-conically shaped movable member having a taper decreasing in the direction toward one end thereof, the first movable member having a bore extending axially therethrough and a second frusto-conically shaped movable member having a taper decreasing in the direction toward one end thereof, the second movable member having a threaded bore extending axially therethrough, and a bolt inserted through the first and second movable members. Rotation of the bolt in one direction causes the first and second members to selectively move toward one another to correspondingly increase the angular spacing between the arcuate recesses and rotation of the bolt in the other direction causes the first and second members to move oppositely from one another, whereby the angular spacing between the arcuate recesses decreases until the arcuate recesses are disposed in their predetermined angular spacing corresponding to the bias position of the hub for clamping securement of the hub to the shaft.

BRIEF DESCRIPTION OF THE DRAWINGS

FIG. 7 is a partial side elevational view of a pair of shafts aligned for coaxial rotation, showing each shaft with one embodiment of the flexible hub apparatus of the present invention secured thereto and shown in vertical section;

FIG. 8 is a partial side elevational view of a pair of shafts aligned for coaxial rotation, showing one embodiment of the flexible hub apparatus of the present invention, in vertical section, secured to each shaft;

FIG. 9 is a partial side elevational view of a pair of shafts aligned for coaxial rotation, showing one embodiment of the flexible hub apparatus of the present invention, in vertical section, secured to each shaft;

FIG. 10 is a horizontal sectional view, taken along lines X—X, of the flexible hub apparatus illustrated in FIG. 9; and FIG. 11 is a front elevational view of another embodiment of the flexible hub apparatus of the present invention.

DETAILED DESCRIPTION OF THE PREFERRED EMBODIMENTS

Figures 1, 2:
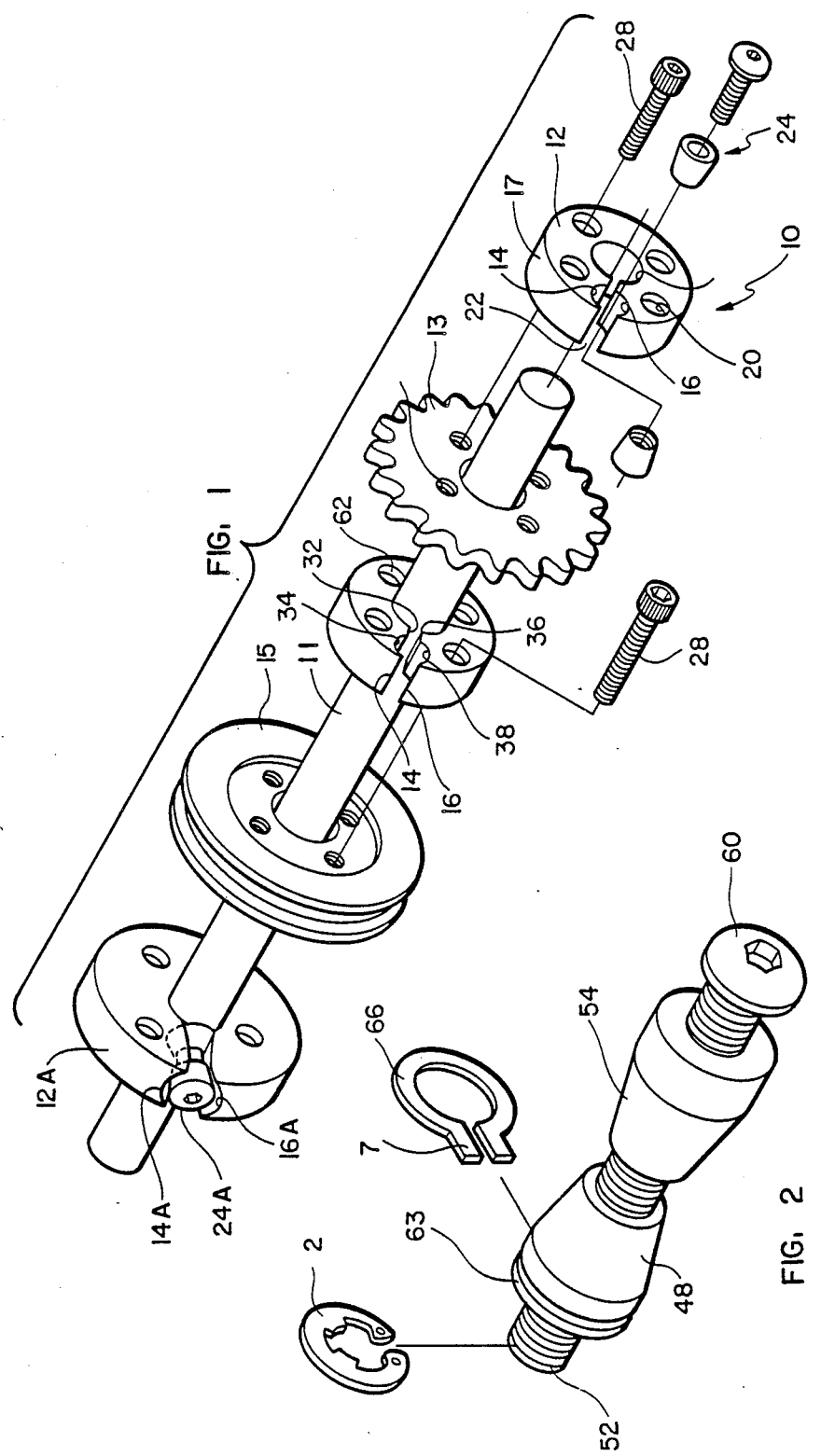
FIG. 1 an exploded perspective view of three embodiments of the flexible hub apparatus of the present invention disposed on a rotating shaft, showing one embodiment for securing a sprocket to the rotating shaft, another embodiment for securing a pulley to the rotating shaft and another embodiment disposed on the rotating shaft in position for receiving a power takeoff element secured thereto.
FIG. 2 is an enlarged perspective view of the hub spacing means of one embodiment of the flexible hub apparatus of the present invention.

In FIGS. 1-6, one preferred embodiment of the flexible hub assembly of the present invention is illustrated and is generally designated as 10. The flexible hub assembly 10 is adapted to transmit torque from a rotating shaft 11 or the like to a sprocket 13, a pulley 15 or other power takeoff element.

The flexible hub assembly 10 includes a generally annularly shaped hub 12 having a first end 14 and a second end 16, a generally cylindrical outer peripheral surface 17, a generally cylindrical inner circumferential surface 18, and a plurality of mounting bores 20 uniformly angularly spaced about one radial face of the hub 12 and extending therethrough to the other radial hub face. The diameter of the surface defined by the inner circumferential surface 18 of the hub 12 is slightly less than the diameter circumferential extent of the shaft 11 which the hub is adapted to engage. The first hub end 14 is spaced from the second hub end 16 by a gap 22 and the hub 12 has an inherent bias acting to urge the first hub end 14 and the second hub end 16 relatively toward one another, thereby effecting a reduction in the effective circumferential extent of the inner circumferential surface 18.

A hub spacing unit 24 is disposed between the first hub end 14 and the second hub end 16 and is operable to selectively vary the extent of the gap 22 between the pair of hub ends to thereby move the hub 12 between a clamping position in which it receives the shaft 11 within the inner circumferential surface 18 and clamps the shaft 11 with sufficient purchase to reliably and fixedly secure the hub to the shaft, and a shaft removal position in which the shaft 11 can be freely removed from its disposition within the inner circumferential surface 18 of the hub 12. A plurality of mounting bolts 28, each disposed in a respective mounting bore 20, interconnect the hub 12 and, thus, the shaft 11, to the sprocket 13 or another suitable power takeoff element.

Each mounting bore 20 is formed with a counterbore 62 of sufficient axial extent that the head of the associated mounting bolt 28, which extends through the mounting bore 20 to interconnect the hub 12 to the sprocket 13, is substantially fully received within the mounting bore 20 so that the end of the mounting bolt 28 is flush with, or slightly recessed from, the radial face of the hub 12.

For reasons discussed more fully below, the mounting bores 20 are of a diameter sufficiently greater than the diameter of the mounting bolt 28 received therein such that the angular shifting of the hub 12 during movement between its shaft clamping position and its shaft releasing position can be accommodated. Accordingly, the flexible hub assembly 10 of the present invention reliably transmits torque from the shaft 11 to the sprocket 13 without the need for a key assembly for interconnecting the shaft 11 and the flexible hub 12.

Referring now in more detail to the hub 12, the hub is composed of heat treated steel and is preferably formed as a single piece. One preferred method of forming the hub 12 is to machine the hub from steel or aluminum to form the hub generally in its finished shape with the outer peripheral surface 17, the inner circumferential surface 18, the gap 22 and the mounting bores 20. In forming steel hubs, the hub is completely machined, except for its inner and outer diameter, in its annealed state and is thereafter heat-treated to provide sufficient springing capability. Thereafter, the hub 12 is sprung open by moving it against its inherent bias to the maximum extent—that is, the hub is opened to an extent approaching approximately the range of the tensile yield strength of the hub—and the outside surface 17 and the inner circumferential surface 18 are machined while the hub is held in its maximum opened position. This hub forming process helps to assure that the outer surface 17 and the inner circumferential surface 18 are substantially concentric. In forming aluminum hubs, the hub is cut from a cylinder of heat treated aluminum or die-cast and then machined.

The hub 12 can be formed of aluminum. Although the tensile yield of aluminum is generally lower than that of steel, the modulus of elasticity is also lower. Accordingly, a heat treated aluminum hub 12 can be urged against its inherent bias to approximately the same degree as an equivalent hub formed of heat treated steel. Also, the aluminum hub 12 is easier to machine than an equivalent, pre-heat treated, steel hub. However, the shaft clamping strength of the aluminum hub is typically less than half that of an equivalent heat-treated steel hub.

With further regard to the first hub end 14, the face of the first hub end includes a planar radial surface 32 formed with a generally cylindrical recess 34. The face of the second hub end 16 is compatibly configured with the face of the first hub end 14 and includes a planar surface 36 formed with a cylindrical recess 38 therein. The recess 34 of the first hub end 14 and the recess 38 of the second hub end 16 are generally at the same radial spacing from the hub axis so as to be aligned with one another for receiving the hub spacing unit 24 therebetween. Each recess 34, 38 is relatively shallow with respect to its largest side-to-side extent. In other words, the shape of the recesses 34, 38 approximates that portion of a circle of relatively large radius which lies between a chord of relatively small extent with respect to the circle radius. This recess geometry, as opposed to a recess geometry of greater depth, tends to limit the magnitude of the generally radial forces which the hub spacing unit 24 applies against the recesses, thereby avoiding detrimental widening of the recesses.

Each recess 34, 38 is formed with a front counterbore 40 extending inwardly from one radial hub end by a relatively small amount and a rear counterbore 42 extending inwardly from the other radial hub end of a relatively small amount. The major axial extent of the portion of the recess 34 which is not counterbored extends between a front inner edge 44 and a rear inner edge 46. Similarly the major axial extent of the portion of the recess 38 which is not counterbored extends between a front inner edge 45 and a rear inner edge 47.

With further regard to the hub spacing unit 24, the unit includes a tapered nut 48 having an inner threaded bore 50, an adjustment bolt 52 having outer threads adapted to be threadably received in the inner threaded bore 50, and a tapered washer 54 having a smooth inner bore 56 for passage therethrough of the adjustment bolt 52. However, if desired, the tapered washer 54 could be threaded oppositely with respect to the threads of tapered nut 48 in which case both the tapered washer 54 and the tapered nut 48 would be moved positively toward and away from one another when bolt 52 is turned. The tapered surfaces of the tapered nut 48 and tapered washer 54 are generally frusto-conical in shape, and the washer 54 is disposed on the adjustment bolt 52 so that its surface has a decreasing taper in the direction toward the tapered nut 48.

The adjustment bolt 52 has a radially enlarged head 60 of greater radius than the outer radius of the threads of the bolt, and the enlarged head 60 has a generally planar surface adapted to abut one axial end of the tapered washer 54. The length of the threaded portion of the adjustment bolt 52 is greater than the combined axial lengths of the tapered nut 48 and the tapered washer 54 so that the adjustment bolt 52 extends axially outwardly beyond the tapered nut 48 when the adjacent end faces of the tapered nut and the tapered washer abut one another.

The outwardly facing surface of the enlarged head 60 of the adjustment bolt 52 has an appropriately shaped bore formed centrally therein for receiving an adjustment tool such as, for example, an Allen wrench. For example, the bore can have a hexagonal shape for receiving a conventional hexagonal shaped Allen wrench.

Preferably, the tapered nut 48 and the tapered washer 54 are heat-treated to a greater hardness than the hub 12, for reasons explained more fully below. Also, the included angle of the tapered surfaces of the tapered nut 48 and the tapered washer 54 —that is, the angle between the axis of the shaft to which it is attached and the tapered surface—is greater than approximately 16 degrees, for reasons explained more fully below.

As best seen in FIG. 2, the hub spacing unit 24 additionally includes a snap ring 66 seated in an annular groove 68 formed on the tapered nut 48. The snap ring 66 includes a pair of adjacent lugs 70 compatibly configured to be received in the gap 22. As described more fully hereinafter, the snap ring 66 automatically prevents the tapered nut 48 from rotating with the adjustment bolt 52 when the adjustment bolt is rotated by a tool to adjust the spacing between the ends of the hub 12. Accordingly, the bolt 52 rotates relative to the tapered nut 48 and correspondingly threads or unthreads along the threaded bore 50 of the tapered nut 48. In lieu of the snap ring 66, a solid ring can be used which is press fitted onto the tapered nut 48.

The hub spacing unit 24 additionally includes a C-ring 72 threaded onto the end of the adjustment bolt 52. As described more fully hereinafter, the C-ring 72 prevents the tapered nut 48 from completely unthreading from the adjustment bolt 52 due to the action of vibration of the hub 12 or the like.

The sprocket 13 includes a plurality of threaded bores 64 compatibly located on the sprocket for receiving the mounting bolts 28 inserted through the mounting bores 20 of the hub 12, and the bores 64 are internally threaded for threadably engaging the mounting bolts 28.

In operation, the flexible hub assembly 10 is installed on the shaft 11 in preparation for mounting the sprocket 13 to the hub 12 such that the torque of the rotating shaft 11 is reliably transmitted to the sprocket 13. To prepare the hub 12 for insertion over the shaft 11, the hub spacing unit 24 is disposed within the gap 22 as follows. The tapered nut 48 is threaded onto the bolt 52 and is located between the recesses 34, 38 with its widened end facing outwardly. The tapered washer 54 is disposed on the adjustment bolt 52 between its enlarged head 60 and the tapered nut 48 and is located between the recesses 34, 38 such that its widened end facing outwardly. Then, by applying an appropriate turning force to the adjustment bolt 52 by, for example, inserting an Allen wrench into the enlarged head 60 and rotating the bolt, the tapered nut 48 is moved toward the tapered washer 54. During the movement of the tapered nut 48 relative to the tapered washer 54, the tapered surface of the tapered washer 54 slidingly engages the front inner edge 44 of the first hub end 14 and the front inner edge 45 of the second hub end 16, while the tapered surface of the tapered nut 48 slidingly engages the rear inner edge 46 of the hub end 14 and the rear inner edge 47 of the hub end 16.

Figure 3:
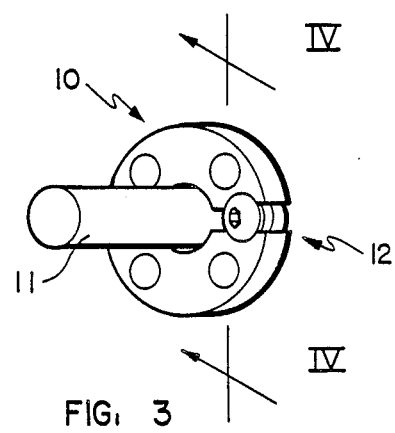
FIG. 3 is a perspective view of one embodiment of the flexible hub apparatus of the present invention, showing the hub of the apparatus in its shaft removal position in which the shaft is freely removable therefrom.
Figure 4:
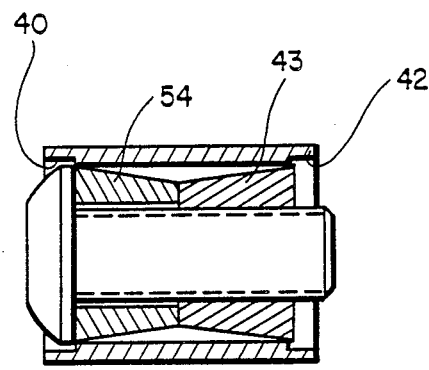
FIG. 4 is vertical sectional view, taken along lines IV—IV, of the flexible hub apparatus illustrated in FIG. 3.

Since the respective tapered surfaces increase in diameter outwardly from the adjacent faces of the tapered nut 48 and the tapered washer 54, the spacing between the first hub end 14 and the second hub end 16 is incrementally increased as the tapered nut and the tapered washer are moved toward one another. As can be appreciated, the movement of the tapered nut 48 and the tapered washer 54 toward one another creates a force acting in opposition to the inherent bias of the hub 12 toward its shaft clamping position. Additionally, it will be appreciated that the effective circumferential extent of the inner effective circumferential surface 18 changes in response to changes in the spacing between the first hub end 24 and the second hub end 16. Specifically, as the spacing between the two hub ends 14, 16 increases, the effective circumferential extent of the inner circumferential surface 18 increases, and vice versa. Eventually, once the tapered nut 48 and the tapered washer 54 have been moved toward one another sufficiently to enlarge the effective circumferential extent of the inner circumferential surface 18 to recess the shaft 11 therethrough, rotation of the adjustment bolt 52 may be ceased. The shaft 11 is then inserted through the inner circumferential surface 18 of the hub 12, as illustrated in FIGS. 3 and 4, and the hub 12 can be positioned at the appropriate axial and angular location on the shaft 11 at which it will be secured to the shaft. Thereafter, the adjustment bolt 52 is rotated in a direction opposite to the direction which it has been turned to initially increase the spacing between the first hub end 14 and the second hub end 16.

Figure 5:
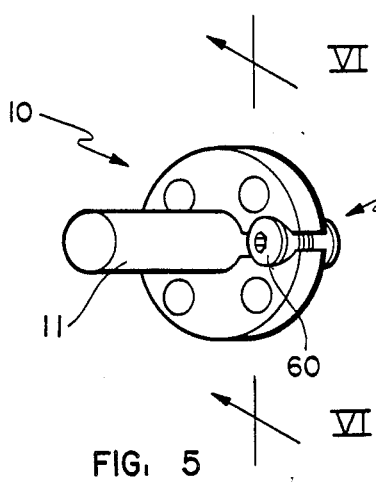
FIG. 5 is a perspective view of one embodiment of the flexible hub apparatus of the present invention, showing the hub thereof in shaft clamping position.
Figure 6:
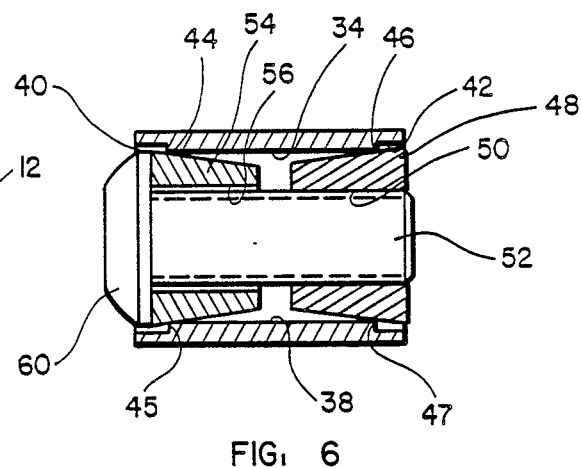
FIG. 6 is a vertical sectional view, taken along lines VI—VI, of the illustrated in FIG. 5.

With the included angles of the surfaces of the tapered nut 48 and the tapered washer 54 being greater than 16 degrees as described above, it has been found that the tapered nut and the tapered washer will inherently be moved away from one another as the adjustment bolt 52 is unthreaded from the inner threaded bore 50 of the tapered nut 48. That is the tapered nut 48 and the tapered washer 54 self-release under the urging of the inherent bias of the hub 12 which applies a force through the front and rear inner edges of first hub end 14 in one direction, and an oppositely directed force through the front and rear inner edges of the second hub 16, against the tapered surfaces of the tapered nut 48 and the tapered washer 54. Since the forces applied by the first hub end 14 and the second hub end 16 are oppositely directed, these forces are directed against opposed portions of the tapered surfaces of the tapered nut 48 and the tapered washer 54. As the tapered nut 48 and the tapered washer 54 move outwardly oppositely to one another, the spacing between the first hub end 14 and the second hub end 16 changes as the tapered surfaces of the tapered nut and the tapered washer slide along the two hub ends. Specifically, the spacing between the hub ends decreases and, correspondingly, the effective circumferential extent of the inner circumferential surface 18 of the hub 12 decreases until, eventually, the hub 12 clamps the shaft 11 with sufficient purchase to secure the hub to the shaft, as illustrated in FIGS. 5 and 6. The hub 12, in its shaft clamping position, thus clamps the shaft 11 due to the forces generated by its inherent bias. Since the effective diameter of the inner circumferential surface 18 in the shaft clamping position of the hub is slightly less than the diameter of the shaft 11, the hub 12 exerts a clamping action on the encircled portion of the shaft 11.

Experience has shown that the tapered nut 48 and the tapered washer 54 may not be held tightly against the respective upper and lower edges of the hub 12 once the hub 12 has clamped the shaft 11. To prevent the tapered nut 48 from completely unthreading from the adjustment bolt 52 under the influence of vibration or other forces, the C-ring 72 adjacent the free axial end of the adjustment bolt 52 acts to prevent such unthreading action. Alternatively, the bolt 52 can be staked adjacent its end portion.

Since the tapered nut 48 and the tapered washer 54 are heat-treated to a higher degree of hardness than the hub 12, the sliding movement of the tapered surfaces of the nut and the washer against the first end 14 and the second end 16 of the hub 12 causes the hub to yield slightly as these ends. Specifically, the front upper edge 44 and the front lower edge 45 conform to the curved tapered washer 54 and thereby perfect the taper fit between themselves and the tapered washer, while the rear upper edge 46 and the rear lower edge 47 conform to the curved surface of the tapered nut 48.

The sprocket 13 can be mounted to the hub 12 after the hub is clampingly secured to the shaft 11. The sprocket is inserted along the shaft 11 until one radial face thereof is generally flush with one radial face of the hub 12. Then, the mounting bolts 28 are inserted through the mounting bore.

To move the hub 12 between its shaft clamping position and its shaft removal position, the user need only insert an Allen wrench or other appropriate tool into the enlarged head 60 of the bolt 52 and turn the bolt in the threading direction, whereby the bolt threads along the inner threaded bore 50 of the tapered nut 48, causing the tapered nut 48 and the tapered washer 54, as described above, to move toward one another. The lugs 70 of the snap ring 66 are positioned in the gap 22 and move into engagement with the hub 12 as the tapered nut 48 rotates in response to the turning of the adjustment bolt 52, thereby preventing further rotation of the tapered nut 48 during turning of the adjustment bolt 52.

Due to the significant mechanical advantage offered by the flexible hub assembly 10 of the present invention, the user need only apply a relatively small torque force to the adjustment bolt 52 to cause the tapered nut 48 and the tapered washer 54 to move toward one another in opposition to the inherent bias of the hub 12. Once the shaft 11 can be moved relatively freely within the confines of the inner circumferential surface 18 of the hub 12, turning of the adjustment bolt 52 is stopped and the hub is removed from the shaft. In any event, the extent of movement of the tapered nut 48 and the tapered washer 54 toward one another is limited to preclude the spacing between the first hub end 14 and the second hub end 16 from increasing to such a degree that the hub exceeds its tensile yield strength and accordingly fails. Specifically, the facing ends of the tapered nut 48 and the tapered washer 54 eventually move into abutment with one another through the continued turning of the adjustment bolt 52 and, once the facing ends abut one another, no further threading of the bolt 52 along the threaded bore 50 is possible.

The flexible hub assembly 10 is also particularly suitable for such mounting inside a counterbored power takeoff element, such as the pulley 15 illustrated in FIG. 1, to interconnect the power takeoff element to the shaft 11. To flush mount the hub 12 within the power takeoff element, the power takeoff element is counterbored at a diameter slightly greater than the outer diameter of the hub 12 and to a depth corresponding to the width of the hub 12. The hub 12 is then recessed within the counterbore of the power takeoff element and the mounting bolts 28 are inserted through the mounting bores 20 of the hub 12 and into the corresponding bores of the power takeoff element to secure the power takeoff element to the hub 12. For example, as seen in FIG. 1, the hub 12 is adapted to be flush mounted inside a counterbore of a pulley 15 and the mounting bolts 28 are adapted to extend into corresponding mounting bores 74 of the pulleys to interconnect the hub 12 and the pulley. With the hub and pulley interconnected, the inner circumferential surface 18 of the hub can be adjusted as described above to clamp the shaft 11 with sufficient purchase to secure the hub to the shaft. Since none of the flexible hub assembly 10 components project radially outwardly beyond the outer circumferential surface 17 of the hub 12, this embodiment of the flexible hub assembly 10 is particularly suited for the flush mounting within a power takeoff element.

Depending upon the circumstances, the flexible hub assembly 10 of the present invention can be alternatively configured to be easily accessible to the user from a different position. For example, if circumstances indicate that the hub spacing member 24 would be difficult to access if disposed generally parallel to the axis of the shaft 11, the hub spacing member 24 and the hub 12 can be alternatively configured. As illustrated in FIG. 1, a hub 12A includes a first end 14A and a second end 16A compatibly configured to receive therebetween a hub spacing member 24A for movement in a radial direction with respect to the shaft 11. The operation of the hub spacing member 24A is the same as hub spacing member 24 described above, except that the adjustment bolt 52, and the accesses 34 and 38, are disposed along an axis that is radial with respect to the shaft 10 rather than parallel to the axis of the shaft.

The flexible hub assembly 10 is particularly well suited to coupling a pair of shafts 11A and 11B together for coaxial rotation as shown in FIG. 7, each shaft being provided with a hub 12 secured adjacent one axial end of each shaft. The shafts are then coaxially positioned with the shaft ends having the hubs 12 secured thereadjacent positioned adjacent one another and the mounting bores 20 of each hub in individual axial alignment with the corresponding mounting bores 20 of the other hub. The mounting bolts 28 are disposed through the aligned mounting bores 20 of the pair of hubs 12 and a plurality of coupling nuts 78, each associated with a respective mounting bolt 28, are threaded onto the bolts to couple the pair of hubs to one another. Thus, the pair of shafts 11A and 11B are constrained by the pair of coupled hubs 12 to rotate coaxially.

According to another embodiment of the flexible hub assembly 10 of the present invention illustrated in FIG. 8, a pair of shafts 11C and 11D can be coupled to one another, by means of a pair of hubs 12, for coordinated rotation with some limited axial misalignment being permitted during rotation. Each hub 12 includes a plurality of angularly equally spaced recesses 82 on one face thereof. One hub 12 is mounted adjacent one axial end of each of the shafts 11C and 11D and the shafts are placed end-to-end with their respective secured hubs 12 disposed adjacent one another with the respective recesses of the hubs in individual axial alignment. One of a plurality of rubber insert plugs 84 is inserted in a respective pair of aligned recesses 82 of the pair of the hubs 12 to couple the hubs to one another. The rubber insert plugs 84 flex slightly to permit limited misalignment of the pair of shafts 11 during rotation thereof.

According to another embodiment of the flexible hub assembly of the present invention illustrated in FIGS. 9 and 10, a pair of hubs 12 are provided to couple a pair of shafts 11E and 11F together for coordinated rotation with some limited axial misalignment being permitted during rotation. One hub 12 is provided with a plurality of angularly equally spaced yokes 86 opening in the same axial direction and the other of the pair or the hubs 12 is provided with a plurality of circumferentially equally spaced inserts 88 each having a curved free end. Each hub 12 is clamped adjacent one axial end of one of a pair of the shafts 11E and 11F which are to be coupled together for coordinated rotation with limited axial misalignment between the shafts being permitted during rotation. The pair of shafts 11E and 11F are then disposed end-to-end with the secured hubs 12 disposed adjacent one another and each of the inserts 88 are aligned with one of the yokes 86 so that each insert is received in a yoke. During rotation of the shafts 11, the inserts 88 can move radially within their respective yokes 86 to effect coordinated rotation of the pair of the shafts 11 while permitting limited axial misalignment between the shafts.

In a further embodiment of the flexible hub assembly 10 of the present invention illustrated in FIG. 11, the hub 12 thereof is formed of plastic and a reinforcing split ring 90 formed of steel or like material is provided to reinforce the plastic hub 12. The use of plastic to form the hub 12 facilitates the manufacturing of hubs of relatively small diameters such as, for example, hubs with diameters less than one-half inch. However, experience has shown that a hub 12 of plastic material which is disposed in its shaft clamping position on a shaft suffers from a reduced clamping force due to the known phenomenon of cold flow—that is, creep. To overcome the decrease in the clamping force of the plastic hub 12 due to the cold flow phenomenon, the reinforcing split ring 90 is positioned in clamping disposition about the outer circumferential surface of the hub to assist in exerting a clamping force of sufficient magnitude to hold the hub on the shaft. The hub spacing unit 24 acts in the same manner as that described above to move the hub between its shaft engaging and shaft releasing positions.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A hub for clamping attachment to a shaft,
    said hub being formed of a resilient material and having a first end and a second end, and said hub defining an inner circumference for receiving the shaft therein for clamping engagement by said hub and having an effective inner circumferential extent,
    said first and second hub ends being movable relative to one another between a shaft clamping position in which said effective inner circumferential extent of said hub is such that said hub clamps the shaft, and a shaft removal position in which said effective inner circumferential extent of said hub is such that the shaft is relatively freely removable from said hub, said effective inner circumferential extent of said hub being less that the circumferential extent of the shaft in the normal, unstressed condition of said hub, whereby said hub has an inherent bias toward its shaft clamping position;
    hub spacing means including at least one movable member disposed between said first and second hub ends and being movable with respect thereto along an axis of movement, said movable member engaging at least one of aid first or second hub ends along a tapered engagement surface that is gradually inclined along its length with respect to said axis of movement, and said movable member being movable along said axis of movement to cause relative movement of said first and second hub ends in a direction generally transverse to said axis of movement of said movable member,
    said hub spacing means including means for selectively moving said movable member relative to said first and second hub ends and along said axis of movement to vary the spacing between said hub ends,
    whereby the movement of said movable member relative to said hub ends selectively permits said inherent bias of said hub to urge said hub toward its shaft clamping position and selectively moves said hub in opposition to said inherent bias toward its shaft removal position.

2. A hub according to claim 1 and characterized further in that said tapered engagement surface is formed on said movable member for surface-to-surface engagement with said first hub end, and a second tapered engagement surface is formed on said movable member for surface-to-surface engagement with said second hub end.

3. A hub according to claim 2 and characterized further in that said hub spacing means further includes a second movable member, said second movable member having a second tapered engagement surface for selective surface-to-surface engagement with said first and second hub ends, said means for selectively moving said movable member engaging said second movable member for moving said first and second movable members relative to one another to vary the spacing between said hub ends.

4. A hub according to claim 3 and characterized further in that said one movable member includes a through bore, said second movable member includes a threaded bore and said means for selectively moving said movable member includes a bolt receivable in said through bore and threadably receivable in said threaded bore.

5. A hub according to claim 4 and characterized further in that said selective moving means further includes a retaining means mountable on said bolt for retaining said first and second movable members on said bolt.

6. A hub according to claim 4 and characterized further in that said tapered surfaces of said first and second movable members define an angle of at least 16 degrees with respect to the axis of said bolt, whereby said first and second movable members are self-releasing in response to the urging of said inherent bias of said hub.

7. A hub according to claim 3 and characterized further in that said one movable member and said second movable member each have a frusto-conical shape.

8. A hub according to claim 7 and characterized further in that said first and second hub ends each have a partially cylindrical recess, said recesses being compatibly configured with said frusto-conically shaped first and second movable members.

9. A hub according to claim 1 and characterized further in that said movable member is moved by said selective moving means along an axis generally parallel to, and spaced from, the axis of the shaft.

10. A hub according to claim 1 and characterized further in that said movable member is selectively movable by said selective moving means along an axis extending radially with respect to the axis of the shaft.

11. A ring-shaped hub for interconnecting a power takeoff element to a shaft for transmission of torque, and other loads from the shaft to the power takeoff element, said ring-shaped hub being adapted to clamp the shaft with sufficient purchase to secure said hub to the shaft,
    said hub having an axis, a generally annular outer surface, and an inner surface defining a circle generally concentric with said outer surface,
    said hub defining a slot extending between said inner and outer surfaces, said slot being formed by a pair of generally opposed faces, each face extending between said inner and outer surfaces and having an arcuate recess formed therein at approximately mid-length between said inner and outer surfaces, said hub being resiliently biased toward a biased position at which said hub is clamped to the shaft with sufficient purchase to secure said hub to the shaft, and said arcuate recesses being disposed relative to one another at a predetermined angular spacing with respect to said axis of said hub in said biased position of said hub, a first frusto-conically shaped movable member having a taper decreasing in the direction toward one end thereof, said first movable member having a bore extending axially therethrough, a second frusto-conically shaped movable member having a taper decreasing in the direction toward one end thereof, said second movable member having a threaded bore extending axially therethrough;

a bolt, said bolt being inserted through said through bore of said first movable member and being threadably received in said threaded bore of said second movable member, and said first and second movable members being oriented relative to one another such that their respective taper decreasing ends are toward one another; and said first and second movable members being disposed in said slot, each movable member extending between said arcuate recesses of said slot and engaging a respective edge of each of said arcuate recesses, whereby rotation of said bolt in one direction causes said first and second members to selectively move toward one another, and whereby the extent of each movable member extending between said respective arcuate recess edges, and, thus, the angular spacing between said arcuate recesses, correspondingly increases and whereby rotation of said bolt in the other direction causes said first and second members to move oppositely from one another, and whereby the extent of each movable member between said respective edges of said arcuate recesses, and, thus, the angular spacing of said arcuate recesses, decreases until said arcuate recesses are disposed in said predetermined angular spacing corresponding to the said biased hub position for clamping securement of said hub to the shaft.

* * * * *

UNITED STATES PATENT AND TRADEMARK OFFICE
CERTIFICATE OF CORRECTION

PATENT NO. : 4,981,389

DATED : January 1, 1991

INVENTOR(S) : Richard F. Keon

It is certified that error appears in the above-identified patent and that said Letters Patent is hereby corrected as shown below:

Column 2, Lines 5-6, reads "elemen-t" but should read -- ele-ment --.

Column 3, Line 50, after "FIG. 1" add -- is --.

Column 4, Line 5, after "of the" add -- embodiment --.

Column 4, Line 43, reads "diameter circumferential extent" but should read -- circumferential extent diameter --.

Column 7, Line 21, after "end" add -- is --.

Column 8, Line 47, reads "as these ends." but should read -- at these ends. --.

UNITED STATES PATENT AND TRADEMARK OFFICE
CERTIFICATE OF CORRECTION

PATENT NO. : 4,981,389

DATED : January 1, 1991

INVENTOR(S) : Richard F. Keon

It is certified that error appears in the above-identified patent and that said Letters Patent is hereby corrected as shown below:

Column 10, Line 41, reads "or" but should read -- of --.

Column 11, Line 46, reads "that" but should read -- than --.

Column 11, Line 54, reads "aid" but should read -- said --.

Column 12, Line 36, reads "16" (in boldface type) but should read -- 16 -- (in regular type).

Column 12, Line 58, after "torque," add -- thrust --.

Signed and Sealed this

First Day of December, 1992

Attest:

DOUGLAS B. COMER

Attesting Officer

Acting Commissioner of Patents and Trademarks